(12) United States Patent
Flom et al.

(10) Patent No.: US 7,317,416 B2
(45) Date of Patent: Jan. 8, 2008

(54) SKELETAL TOPOGRAPHY IMAGING RADAR FOR UNIQUE INDIVIDUAL IDENTIFICATION

(76) Inventors: Leonard Flom, 40 Hamilton Ct., Fairfield, CT (US) 06824; Ophir Almog, 2 Eli Cohen St., Herzelya 46480 (IL)

( * ) Notice: Subject to any disclaimer, the term of this patent is extended or adjusted under 35 U.S.C. 154(b) by 0 days.

(21) Appl. No.: 11/614,709

(22) Filed: Dec. 21, 2006

(65) Prior Publication Data

US 2007/0176821 A1 Aug. 2, 2007

Related U.S. Application Data

(60) Provisional application No. 60/753,540, filed on Dec. 22, 2005.

(51) Int. Cl.
*G01S 13/00* (2006.01)

(52) U.S. Cl. .......................................... 342/90; 342/22

(58) Field of Classification Search ................ 342/90, 342/22
See application file for complete search history.

(56) References Cited

U.S. PATENT DOCUMENTS

| | | | | |
|---|---|---|---|---|
| 6,417,797 | B1 * | 7/2002 | Cousins et al. | 342/179 |
| 6,466,155 | B2 * | 10/2002 | Taylor et al. | 342/22 |
| 6,970,576 | B1 * | 11/2005 | Tilsley | 382/103 |
| 2005/0286767 | A1 * | 12/2005 | Hager et al. | 382/190 |
| 2006/0008119 | A1 * | 1/2006 | Chang et al. | 382/103 |
| 2006/0170584 | A1 * | 8/2006 | Romero et al. | 342/22 |
| 2007/0073144 | A1 * | 3/2007 | Simpkin | 600/430 |

FOREIGN PATENT DOCUMENTS

WO    WO 2005/092191    * 10/2005

* cited by examiner

*Primary Examiner*—Ian J. Lobo
(74) *Attorney, Agent, or Firm*—St. Onge Steward Johnston & Reens LLC

(57) ABSTRACT

A system for identifying an individual, including an imaging radar for receiving radar data pertaining to at least a portion of a skeleton of at least one individual, an imaging module for generating at least one skeletal image of the at least one individual based on the radar data, at least one database including a plurality of skeletal data pertaining to a plurality of individuals, an identification module for comparing the at least one skeletal image with the plurality of skeletal data to determine a match.

19 Claims, 3 Drawing Sheets

SKELETAL TOPOGRAPHY IMAGING RADAR FOR UNIQUE INDIVIDUAL IDENTIFICATION

CROSS-REFERENCE TO RELATED APPLICATIONS

This application claims priority benefits under 35 § U.S.C. 119(e) of the U.S. Provisional Application No. 60/753,540, filed on Dec. 22, 2005.

FIELD OF THE INVENTION

The invention relates to imaging radar systems, and more specifically to a skeletal imaging radar system for identifying individual persons or animals.

BACKGROUND OF THE INVENTION

Imaging radars are known in the art, e.g., for use in environmental monitoring and earth-resource mapping. Typically imaging radars are active systems which send pulses and receive radial reflected radiation after striking a material in its path. The radiation received is comprised of both radiometry information (e.g., the intensity of the reflection energy) and spatial information (e.g., the distance and the azimuth of the material relative to the sensor). An imaging radar works like a flash camera in that it provides radiation to one or more surfaces and generates an image based on radiation reflected from the surface. However, imaging radar uses microwaves to generate the image rather than visible light.

Because imaging radar systems generally do not require illumination from the sun, but from itself, they can generate images at any time of day or night due to its ability to produce the energy and transmit it. Further, because the radar wavelengths are much longer than those of visible or infrared light, imaging radar systems can often capture images through cloudy and dusty conditions while visible and infrared instruments cannot.

The main difference between radar imaging and optical imaging is the behavior of the reflected beam energy. While optical systems generally moves toward a straight line, imaging radar systems generally move radially to determine the distance and the azimuth angle from the material in addition to the intensity radiation value. The spatial resolution depends on sensor geometrical parameters.

One type of such imaging radar systems is Synthetic Aperture Radar (SAR). As one of ordinary skill in the art will understand, the length of the radar antenna generally determines the resolution in the azimuth (along-track) direction of the image: the longer the antenna, the finer the resolution in this dimension. SAR systems are able to synthesize or simulate a very long antenna by combining signals (echoes) received by the radar as the radar moves along a path or flight track. The aperture, or area used to receive signals, is therefore created artificially during the signal processing.

As the radar moves, a pulse is transmitted at each position. The return signals or echoes pass through the receiver and are recorded. Because the radar is moving relative to the ground, the returned echoes are Doppler-shifted (negatively as the radar approaches a target; positively as it moves away). Comparing the Doppler-shifted frequencies to a reference frequency allows many returned signals to be "focused" on a single point, effectively increasing the length of the antenna that is imaging that particular point.

There are some advanced image processing techniques for improving the spatial resolution by acquiring the images at different phase angles relative to the surface. These techniques can improve the resolution beyond the limitation of the sensor. There are also certain techniques to increase the field of view of the images by acquiring them from spatial different positions, e.g. a sensor which is rapidly moving along a circular rail.

SUMMARY OF THE INVENTION

It is an object of the present invention to provide a means to identify individuals at a distance and/or without requiring direct contact.

It is also object of the present invention to provide an imaging radar system and method for identifying individuals based on their skeletal topography or structure.

It is a further object of the present invention to provide an imaging radar system that is compact and safe for use in mapping the topography of the human skeleton and portions thereof.

These and other objectives are achieved by providing a system for a system for identifying an individual, including an imaging radar for receiving radar data pertaining to at least a portion of a skeleton of at least one individual, an imaging module for generating at least one skeletal image of the at least one individual based on the radar data, at least one database including a plurality of skeletal data pertaining to a plurality of individuals, and an identification module for comparing the at least one skeletal image with the plurality of skeletal data to determine a match. In some exemplary embodiments, the identification module provides identifying information pertaining to the individual and/or generates an alert if a match is determined. In other exemplary embodiments, the identification module grants access to the individual if a match is determined.

Other objects of the present invention are achieved by providing a system for identifying an individual, including an imaging radar for generating one or more skeletal images of at least one individual, a processor, at least one database in communication with the processor including a plurality of skeletal data pertaining to a plurality of individuals, and software executing on the processor for matching the skeletal images to skeletal data in the database to identify the at least one individual.

Further provided is a method of identifying an individual, including the steps of transmitting at least one imaging radar signal, receiving radar data pertaining to a skeleton of at least one individual, generating a skeletal image of the at least one individual based on the radar data, and comparing the skeletal image to a plurality of skeletal data records to determine a match. In some aspects, the method includes providing identifying information pertaining to the at least one individual if a match is determined wherein the identifying information includes any one or all of a name, an address, citizenship, a social security number and/or a passport number. In other aspects, the method includes the steps of generating an alert if a particular individual is identified. In other respects, the method includes granting access to the at least one individual if a match is determined.

In some aspects, the method for identification is based on data mining concepts, and includes advanced processing techniques for emphasizing relevant information among the images and/or removing irrelevant information.

Other objects, features and advantages according to the present invention will become apparent from the following detailed description of certain advantageous embodiments

DETAILED DESCRIPTION OF THE INVENTION

Figure 1:
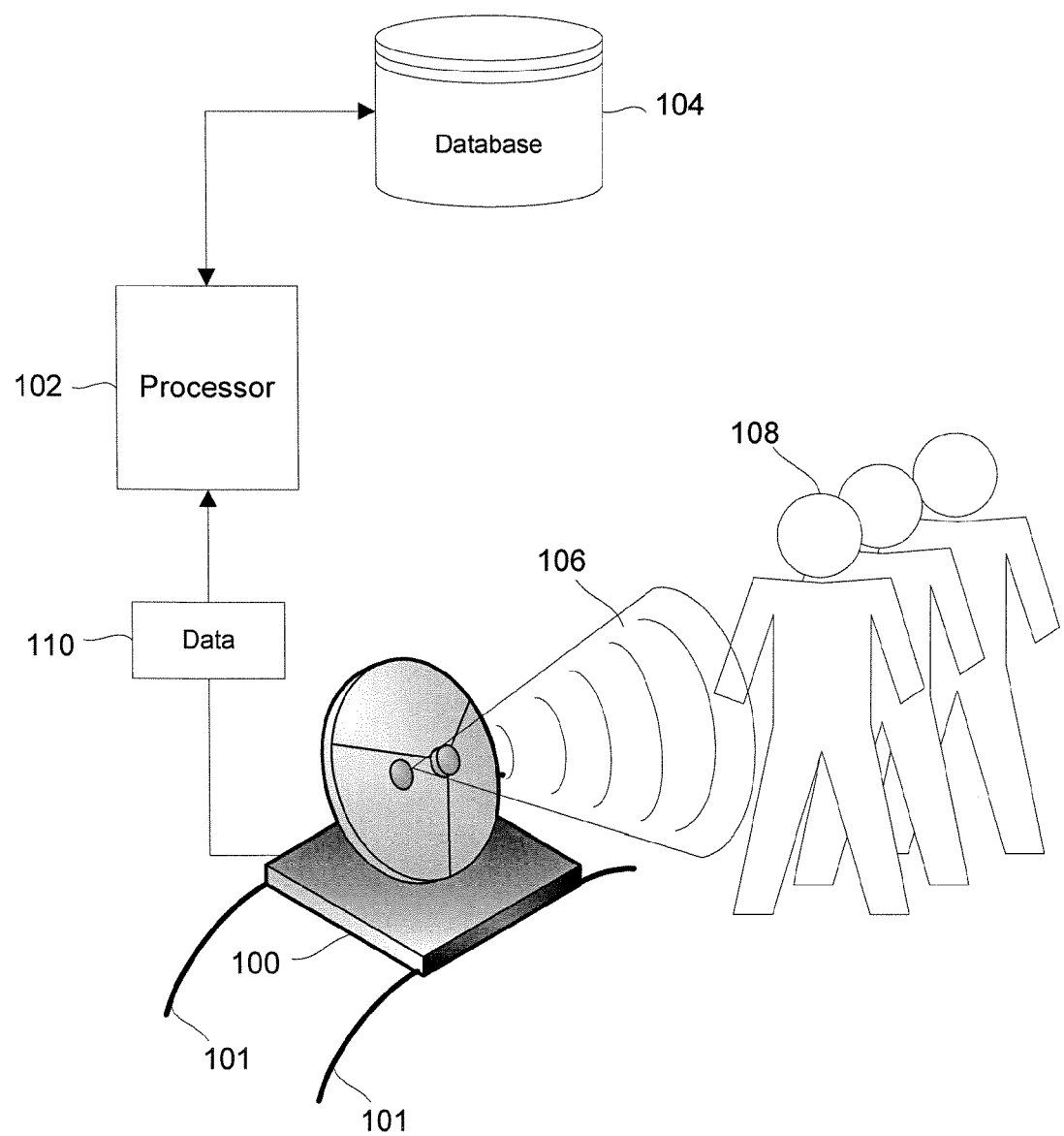
FIG. 1 is a schematic diagram of an imaging radar system for identifying individuals according to an exemplary embodiment of the present invention.

FIG. 1 shows an exemplary imaging radar system for identifying individuals according to the present invention. The system includes an imaging radar 100. The imaging radar 100 may be any imaging radar. For example, the imaging radar 100 may be a Synthetic Aperture Radar ("SAR"). In one embodiment, the imaging radar 100 is located at a ground location (either active or fixed). For example, the imaging radar 100 may be at a security checkpoint (e.g., airport, secure facility, etc.). In other embodiments, the imaging radar 100 is an active radar mounted on an aerial platform such as a satellite or an aircraft. The radar may also be mounted on a track and/or rail system 101 (e.g., on the ground, a floor, and/or a roof) along which it can be moved rapidly.

The exemplary embodiment shown in FIG. 1 further includes a processor 102. The processor 102 may be any device, system or part thereof that controls at least one operation and/or executes software applications. The processor 102 may be implemented in hardware, firmware or software, or some combination of at least two of the same. It should be noted that the functionality associated with any particular controller may be centralized or distributed, whether locally or remotely. In some embodiments, the processor 102 is included in a server accessible via a communication network and/or the Internet.

The system further includes any number of databases 104. The databases 104 may be centrally located with the processor 102, or remotely located and accessible via a communication network. The databases 104 include information or data (e.g., images) pertaining to the skeletal structure or topography of any number of individuals. The databases 104 further include identifying information corresponding to the skeletal data. For example, the database 104 may include any number of data records, each of which pertain to an individual (e.g., person or animal). The data records may then include skeletal data for the individual and identifying information such as a name, an address, unique codes or identifiers (e.g., passport number, social security number, employee ID), etc. As will described below, the processor 102 may then execute software to match a radar image to the information and/or data stored in the database 104 to identify the individual.

As shown in FIG. 1, the imaging radar 100 may transmit and/or pulse electromagnetic energy and/or radiation 106 (e.g., microwave radiation) at one or more human beings or individuals 108 (or any being). For example, the imaging radar 100 may transmit multi-spectrum wavelengths toward a radar range. The imaging radar 100 may be effective in close range applications and at substantial distances (e.g., via an aircraft and/or satellite). The imaging radar 100 records the origin and intensity if backscatter received from objects or individuals.

Returned signals and/or radar data 110 is sent (e.g., wirelessly) to the processor 102. Based on the returned signals (e.g., echoes) from an individual 108, one or more images are generated including, preferably, images or image models (e.g., two-dimensional or three-dimensional) of the skeletal structure and skeletal topography of the individual 108. For example, a three-dimensional topography reconstructed model may be generated. The system may also generate facial recognition images and, in some embodiments, blood vessel mapping images. The imaging radar 100 may generate images of the entire skeleton of the individual or any portion or portions thereof. In some embodiments, the imaging radar 100 also generates and/or stores position or location data of the individual 108 (e.g., GPS coordinates).

As one of ordinary skill in the art will understand, the radar data 110 may require post-processing of the returned signals to generate the images. This may include a multi-resolution method of emphasizing relevant information and/or removing irrelevant information. The imaging radar 100 may therefore process the returned signals via a processor (not shown) of the imaging radar 100, the processor 102, or any means to generate images or useable data from the returned signals. For example, the system may employ a geometrical method to build a model (e.g., 3D model) of an acquired object. The system may also use radiometry and geometrical methods based on an intensity value of radiation reflectance utilizing the geometrical correlation between adjacent pixels. Further, the system may use advanced radiometry methods to generate multi or hyper spectral images (e.g., hyperspectral imaging), and/or a combination of several such methods. The system may also differentiate signals related to bone from those related to other parameters of an individual (e.g., clothing, skin, muscle, etc). Over time, the system may train itself to recognize particular data and assign it to a correct group.

As described above, the processor 102 includes software for matching images or data 110 received from the imaging radar 100 to skeletal data or images stored in the database 104. The processor 102 compares an entire skeletal image or portions thereof to skeletal data from the database(s) 104. For example, the processor 102 may compare the topography or surface structure of a skull, or portion thereof, to corresponding images stored in the database 104. As the skeletal topography of each individual is unique, similar to a fingerprint, the system may therefore identify a particular individual based on such comparison or matching of their skeletal topography. In some embodiments, the processor 102 may further compare and/or match relative positions between different portions or structures of the skeleton to identify the individual.

It is contemplated that the quantity of images and therefore identities stored in the databases 104 will increase over time through use of system according the present invention. Further, images may be gathered in manners similar to that which databases of fingerprints are generated. For example, in security applications, information on suspicious individuals may be gathered upon individual's arrests and/or incarceration. Information pertaining to non-suspicious individuals may also be obtained and stored. For example, individuals that pass one or security checks (e.g., government background check) may be identified as non-suspicious. Therefore, one or more global databases of skeletal data may be maintained to identify any or all individuals in the world's population. Alternatively, users of the system may select or subscribe to focused databases having skeletal data pertaining to any subset of the population, such as employees of a particular organization, a group of individuals requiring access to a secure facility, licensed drivers (e.g., in a particular state), passport holders, individuals on a watch list (e.g., terrorist watch list), etc.

Figure 2:
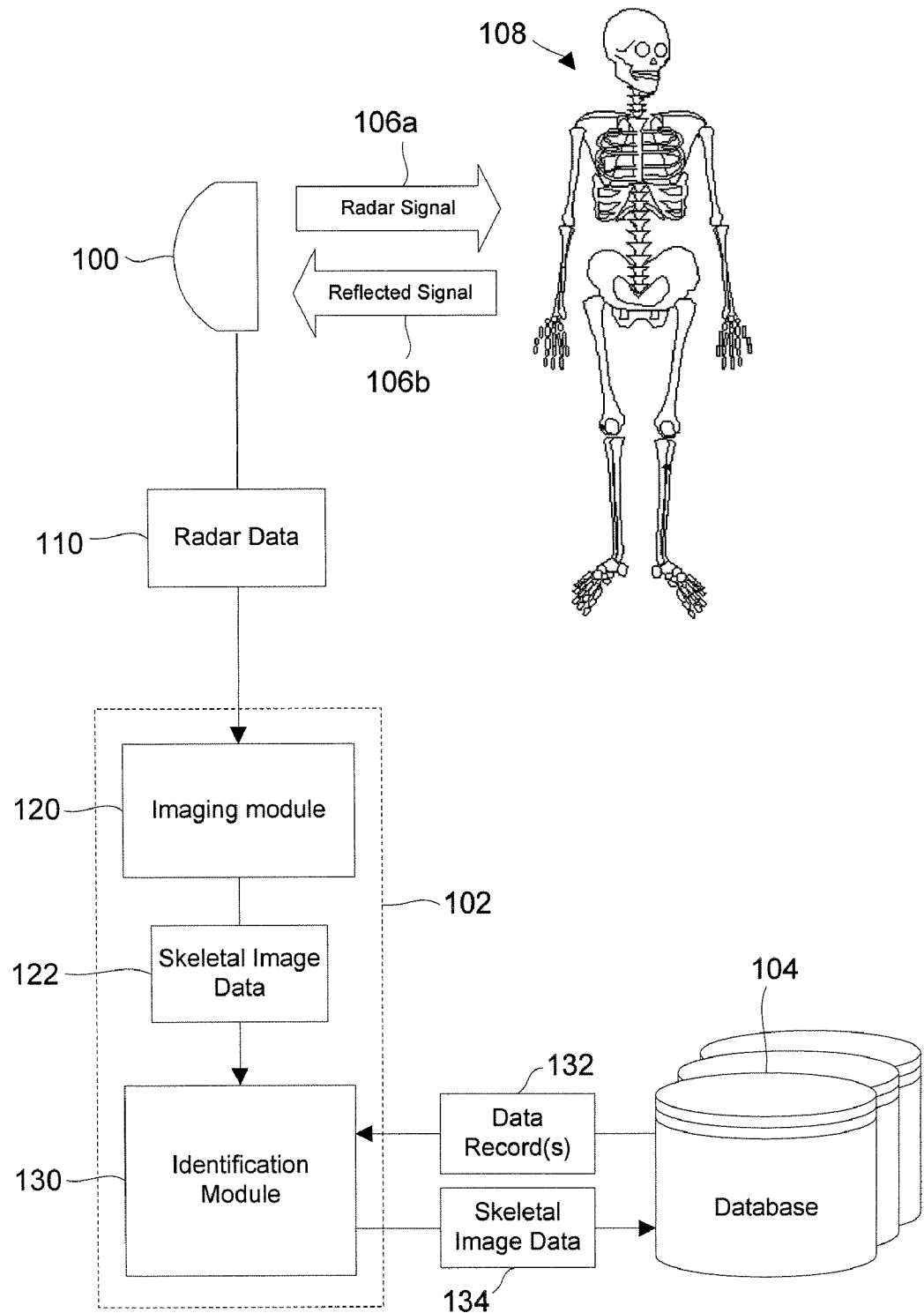
FIG. 2 is another schematic diagram of the imaging radar system for identifying individuals according to an exemplary embodiment of the present invention.

FIG. 2 shows another schematic diagram of an exemplary embodiment of the system. As shown, the system includes one or more radars 100 for capturing radar data 110 and/or imagery indicative of or pertaining to the skeleton of an individual 108. The radar 100 transmits a signal or pulses 106a and receives reflected signals 106b. The system further includes an imaging module 120 for processing the radar data 110 and generating an image or images 122 of the individual's skeleton or portions thereof based on the reflected signals 106b.

Further included is an identification module 130 for comparing the skeletal image data 122 with a plurality of skeletal data (e.g., stored in the database 104) to determine a match. A match may be determined based on topography of the individuals skeleton or select portions thereof. A match may also be determined, alternatively or in combination, based on relative distances between portions or structures of the skeleton. If a positive match is found, identifying information associated with the skeletal data/data record 132 may be provided. For example, a user of the system, such as an airport security agent or an intelligence agent, may receive the identifying information or data records 132.

In some embodiments, access may be granted to the individual upon a positive match. For example, the present invention may be used for identification purposes for access to, e.g., a secure facility, a border, or an electronic file location. Therefore, upon a successful match to a data record 132 which has been approved for access, access is granted.

The system may further generate an alert and/or initiate an action (e.g., block access) when one or more particular individuals are identified. For example, a user may choose to receive an alert when a skeletal image matches skeletal data for an individual in a particular subset and/or on a particular watch list. The alert may be any desired alert including but not limited to a display, a visual alert, an audible alert, electronic message(s), etc. In one embodiment, the watch list is a terrorist watch list. However, watch lists may include any subset of individuals such as suspected or convicted terrorists or criminals, wanted persons, missing and/or abducted persons, etc. Watch lists may be separate data records or lists maintained in the databases 104 or elsewhere (e.g., government database or website). However, as one of ordinary skill in the art will understand, a watch list may also be a group of tags, indicators and/or identifiers separately stored in data records corresponding to particular individuals.

The system may further include software for storing skeletal image data 134, or a portion thereof, in the at least one database 104. For example, if no match is found, the system may create a new data record 132 and store the skeletal image data 134 and any additional identifying information known for the individual 108. Additional and/or updated images and data may also be stored for individuals as necessary or desired.

Figure 3:
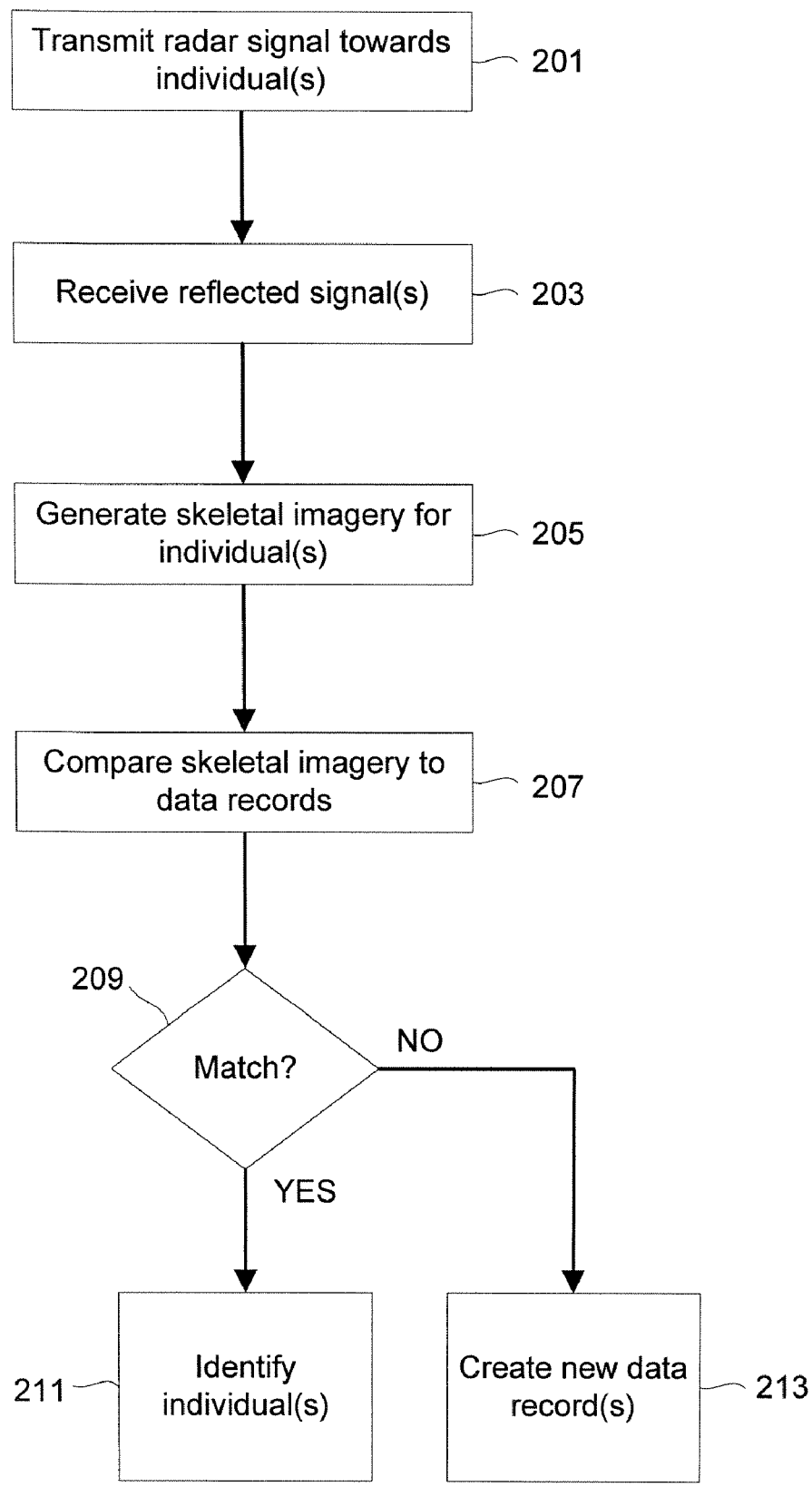
FIG. 3 illustrates an exemplary method of identifying one or more individuals employable by the system shown in FIGS. 1-2.

FIG. 3 shows a method of identifying one or more individuals employable by the system shown according to the present invention. The method includes a step of transmitting a radar signal(s) or otherwise activating an imaging radar (step 201). Reflected signals and/or radar data is received and a skeletal image or images are generated (steps 203-205). Next, the skeletal images (e.g., skeletal topography images) are compared to data records of skeletal data and images to determine a match (step 207-209). If a match is found, the individual is identified (step 211). As such, identifying information pertaining to the individual may be provided, access granted or denied and/or an alert generated. If no match is found, a new data record pertaining to the imaged individual may optionally be created (step 213). Data records may further be updated and/or archived as desired.

Advantages of the present invention include the provision of a system and method for accurately identifying an individual (either living or deceased) at any distance. Further, the present invention may advantageously identify individuals without requiring contact with or physical evidence from the individual (e.g., fingerprint, etc). Thus, neither contact nor cooperation with an identification system by the individual is necessary. The system according to the present invention may be useful, for example, for remotely locating and/or identifying criminal suspects or missing persons. Further, the system may be useful for identifying a non-living human being, e.g., in a remote and/or otherwise difficult to access location.

Although the invention has been described with reference to a particular arrangement of parts, features and the like, these are not intended to exhaust all possible arrangements or features, and indeed many modifications and variations will be ascertainable to those of skill in the art.

What is claimed is:

1. A system for identifying an individual, comprising:
an imaging radar for receiving radar data pertaining to at least a portion of a skeleton of at least one individual;
an imaging module for generating at least one skeletal topography image of the at least one individual based on the radar data;
at least one database including a plurality of skeletal topography data pertaining to a plurality of individuals; and
an identification module for comparing the at least one skeletal topography image with the plurality of skeletal topography data to determine a match.

2. The system according to claim 1,
wherein said identification module provides identifying information if a match is determined.

3. The system according to claim 2,
wherein the identifying information includes at least one of a name, an address, a citizenship, a social security number and a passport number.

4. The system according to claim 1,
wherein said identification module stores at least a portion of the at least one skeletal topography image in said at least one database.

5. The system according to claim 1,
wherein said identification module grants access to the at least one individual if a match is determined.

6. The system according to claim 1, wherein said identification module generates an alert if a match is determined to skeletal topography data of an individual on a watch list.

7. The system according to claim 1, wherein said imaging radar is a synthetic aperture radar.

8. The system according to claim 1, wherein said imaging module generates the at least one skeletal topography image using hyperspectral imaging.

9. The system according to claim 1, wherein said at least one database is frequently updated.

10. The system according to claim 1, wherein the at least one skeletal topography image is a three-dimensional topography reconstructed model.

11. The system according to claim 1, wherein said imaging radar receives the radar data without cooperation from the at least one individual.

12. A system for identifying an individual, comprising:
an imaging radar for generating one or more skeletal images of at least one individual, wherein the one or more skeletal images include skeletal topography images;
a processor;
at least one database in communication with said processor including a plurality of skeletal data pertaining to a plurality of individuals, wherein the skeletal data includes skeletal topography data; and
software executed by the processor for matching the one or more skeletal images to skeletal data in the database to identify the at least one individual.

13. The system according to claim 12,
wherein the one or more skeletal images include-skeletal structure images; and
wherein said software for matching further matches the skeletal data includes skeletal structure data.

14. The system according to claim 12,
wherein said imaging radar is a synthetic aperture radar.

15. The system according to claim 12, further comprising:
software executed by said processor for storing identifying information with the skeletal data.

16. The system according to claim 12, further comprising:
software executed by said processor for granting access to the at least one individual if a match is determined.

17. The system according to claim 12, further comprising:
software executed by said processor for providing identifying information if a match is determined.

18. The system according to claim 12, further comprising:
software executed by said processor for generating an alert if a match is determined to skeletal data of an individual on a watch list.

19. A system for identifying an individual, comprising:
an imaging radar for receiving radar data pertaining to at least a portion of a skeleton of at least one individual, said imaging radar mounted on an aerial platform remote to the at least one individual;
an imaging module for generating at least one skeletal topography image of the at least one individual based on the radar data;
at least one database including a plurality of skeletal topography data pertaining to a plurality of individuals;
an identification module for comparing the at least one skeletal topography image with the plurality of skeletal topography data in the database to determine a match, wherein said identification module provides identifying information pertaining to the at least one individual if a match is determined; and
software executed by said processor for generating an alert if a match is determined to skeletal topography data of an individual on a watch list.

* * * * *